US009672385B2

(12) United States Patent
Newell

(10) Patent No.: US 9,672,385 B2
(45) Date of Patent: Jun. 6, 2017

(54) METHOD OF IMPROVING FPGA SECURITY USING AUTHORIZATION CODES

(71) Applicant: Microsemi SoC Corporation, San Jose, CA (US)

(72) Inventor: G. Richard Newell, Tracy, CA (US)

(73) Assignee: Microsemi SoC Corporation, San Jose, CA (US)

( * ) Notice: Subject to any disclaimer, the term of this patent is extended or adjusted under 35 U.S.C. 154(b) by 0 days.

(21) Appl. No.: 14/485,833

(22) Filed: Sep. 15, 2014

(65) Prior Publication Data
US 2015/0100793 A1    Apr. 9, 2015

Related U.S. Application Data

(60) Provisional application No. 61/887,719, filed on Oct. 7, 2013.

(51) Int. Cl.
| H04L 29/06 | (2006.01) |
| G06F 21/76 | (2013.01) |
| H04L 9/32  | (2006.01) |
| H04L 9/08  | (2006.01) |
| G06F 21/12 | (2013.01) |
| G06F 17/50 | (2006.01) |

(52) U.S. Cl.
CPC .......... G06F 21/76 (2013.01); H04L 9/0877 (2013.01); H04L 9/3226 (2013.01); H04L 9/3234 (2013.01); H04L 9/3263 (2013.01); G06F 17/5054 (2013.01); G06F 21/125 (2013.01)

(58) Field of Classification Search
None
See application file for complete search history.

(56) References Cited

U.S. PATENT DOCUMENTS

| 6,904,527 B1 * | 6/2005  | Parlour ................... G06F 21/76  |
|                |         | 713/100                                |
| 7,254,800 B1 * | 8/2007  | Trimberger ......... G06F 17/5054      |
|                |         | 716/117                                |
| 8,417,965 B1 * | 4/2013  | Sundararajan ........ H04L 9/0825      |
|                |         | 380/30                                 |
| 2002/0199110 A1 * | 12/2002 | Kean ................... G06F 17/5054 |
|                |         | 713/189                                |

* cited by examiner

Primary Examiner — Hadi Armouche
Assistant Examiner — Andrew Steinle
(74) Attorney, Agent, or Firm — Leech Tishman Fuscaldo & Lampl, LLP; Kenneth D'Alessandro, Esq.

(57) ABSTRACT

A method for securely programming a population of authorized FPGAs includes defining the population of authorized FPGAs, generating an encrypted configuration bitstream for the population of authorized FPGAs, generating an individual Authorization Code for each FPGA in the population of authorized FPGAs, feeding the individual Authorization Codes into the FPGAs in the population of FPGAs, feeding the encrypted configuration bitstream into all of the FPGAs in the population of FPGAs, and in each FPGA using the Authorization Code to decrypt the encrypted configuration bitstream to program the FPGA.

6 Claims, 3 Drawing Sheets

METHOD OF IMPROVING FPGA SECURITY USING AUTHORIZATION CODES

CROSS REFERENCE TO RELATED APPLICATIONS

This application claims the benefit of U.S. Provisional Patent Application No. 61/887,719, filed Oct. 7, 2013, which is hereby incorporated by reference in its entirety.

BACKGROUND OF THE INVENTION

Field of the Invention

Field Programmable Gate Arrays (FPGAs) are electronic integrated circuits where the digital logic functions of the chip are determined by configuration data which is loaded into them. There are two predominant types of FPGAs today: those where the configuration data is held inside the device in volatile memory such as SRAM cells, and those where the configuration data is held in non-volatile memory such as flash memory cells. In the FPGAs using non-volatile configuration memory, the configuration data, often referred to as a "bitstream", needs only be loaded once, usually during the circuit board manufacturing step soon after the FPGAs are soldered to the board, but it is also possible to program them in sockets before board assembly. Depending on the type of non-volatile memory used (e.g., anti-fuse vs. flash) it may be possible to optionally overwrite the design during development, manufacturing or later, in fielded systems. In FPGAs, using volatile configuration memory the data needs to be loaded each time power is removed and reapplied, therefore in SRAM FPGAs this configuration process must be performed repeatedly in fielded devices, i.e., at each power-up event.

Description of Related Art

The configuration data is most often regarded as proprietary intellectual property (IP). In order to protect the confidentiality of the IP and to ensure that only authentic bitstreams are loaded into devices, most higher-end FPGAs today include the ability to decrypt the bitstream upon loading, in which case the electronic design automation (EDA) tools that create the bitstream will prepare the bitstream in encrypted form in preparation for later decryption inside the device. Typically, a symmetric encryption scheme, for example, based on the Advanced Encryption Standard (AES) symmetric block cipher is used. In such symmetric schemes, the key used for encryption of the bitstream by the EDA tool is the same as the key used for decryption within the FPGA. The FPGA is loaded with this key (or its precursors) prior to loading the bitstream. It is common practice to load the same key into all the FPGAs used in a particular project where the desired as-configured FPGA functionality is the same, thus facilitating the use of the exact same encrypted bitstream for all the FPGAs in this group. In the prior art, using a different key in every FPGA would require encrypting the configuration bitstream, which is a relatively large amount of data, unique for each FPGA in the project (which could be a large number of FPGAs). This is generally considered to be too inefficient and costly in terms of compute time and storage space to be practical.

Encryption of the bitstream is an important step in protecting the IP it embodies. Creating working FPGA configuration files can be expensive in terms of engineering time, and can also include other valuable intellectual property of the IP owner such as trade secrets or even information of a national security interest. So, protecting the confidentiality of the IP is an important end in itself. Another reason to protect the confidentiality (and authenticity) of the configuration bitstream is that, being digital data, it is easily copied. Without the protection offered by cryptographic methods, it would be too easy for anyone to monitor the bitstream during loading and then make copies which are then loaded into additional FPGAs to produce unauthorized clones. When this is done by an unethical agent of the IP owner, such as his contract manufacturer, that is cloning not only the FPGA but also the entire board or system in which it is used, this is commonly called "overbuilding." Making cloned copies of configured FPGAs does not necessarily require reverse engineering; it merely requires access to either the unencrypted configuration data (in which case it can be programmed directly into additional devices in plaintext, or encrypted under a new key and loaded), or the original key used by the legitimate devices to decrypt and authenticate incoming configuration data (in which case the existing encrypted file can be used to program additional devices after first loading the original key).

Positive control of the number of FPGAs that can be successfully configured with the IP owner's design can be used to effectively prevent overbuilding, since if the FPGAs cannot be cloned easily it is much more difficult to clone the entire system. In the prior art, overbuilding protection has been accomplished by carefully controlling the number of FPGAs with the (typically project-wide) decryption/authentication key loaded. Since only the FPGAs with the correct key(s) will successfully load the properly encrypted bitstream, the number of working systems that can be manufactured is also indirectly controlled. Yet another reason to keep the configuration bitstream confidential and to authenticate bitstreams that are accepted by the FPGAs is that if the design is reverse engineered from the bitstream there is a threat of it being modified in a malicious way, such as with the insertion of a Trojan Horse.

The cryptographic key needs to be stored in non-volatile memory, even in SRAM-based FPGAs. In SRAM FPGAs, the key must be persistent because it is required for decrypting the bitstream upon each power-up cycle. There are two common ways to make the key persistent in SRAM FPGAs: either the SRAM FPGA is equipped with enough non-volatile memory (e.g., anti-fuse cells) in order to hold the key, or a small amount of volatile memory is kept powered-on with the aid of a battery so the key is not lost when the rest of the device is powered-down. In flash-based FPGAs, since the configuration itself is persistent, the key only needs to be persistent if the configuration of the FPGA needs to be changed at a later date, and encryption protection is desired. For example, this could be for an update performed in a less-trusted location, such as in a fielded system, where the threat of monitoring attacks is greater.

Many FPGAs are loaded by the original component manufacturer with a unique-per-device public value, such as a serial number, though different names may be used for it. In some prior art flash-based FPGAs, a shared manufacturer secret key may be pre-loaded in a multitude of devices. However, in no prior art FPGAs did the manufacturer load a unique-per-device secret (or private) key intended to be used for protecting user configuration data with encryption and/or authentication. One ostensible reason for this has been the impracticality of encrypting a separate bitstream configuration file for each device due to the large amount of configuration data.

SUMMARY OF THE INVENTION

The present invention is a cryptographic method of protecting FPGA design configuration data from various types of attacks including protecting the confidentiality of the data against monitoring and man-in-the-middle attacks, and also for protecting against the loading of the configuration data in more devices than authorized by the IP owner, commonly called an overbuilding attack. The present invention provides these protections for a single IP owner, or when there are multiple IP owners, each providing a portion of the overall FPGA configuration data, at the same time or at different times while keeping each portion confidential and preventing overbuilding. The invention also improves security with respect to preventing reverse engineering attacks.

In accordance with the present invention, a single unique-per-device secret (or private) cryptographic key persistently stored on the device may be used to provide the protection of the IP loaded from multiple IP owners, making up the overall FPGA configuration. The invention allows a single common encrypted configuration file containing the IP to be loaded on all the devices in a project that are to be configured the same way, even though the persistent key stored in the FPGA is different for each device. This is accomplished by transporting the key used for encrypting the common configuration data into each device wrapped (i.e., encrypted) by a device-specific key in a construct called an Authorization Code, as will be taught by the invention. Unlike in the prior art, the configuration data encryption key, the payload of the Authorization Code, is ephemeral in the present invention and is not stored persistently on each device but rather is erased immediately after its use in decrypting and/or authenticating the configuration data.

In one embodiment of the invention, the wrapper key used to generate the Authorization Code is derived from a symmetric unique-per-device key that is stored persistently in the device. In another embodiment of the invention, the wrapper key used to generate the Authorization Code is derived using public key methods from a unique-per-device private key stored persistently in the device. In both exemplary embodiments, the wrapper key is unique on a per-device basis, and the payload key is the same for all the Authorization Codes. Thus, the set of Authorization Codes can provide a many-to-one mapping from keys known by the FPGAs to the key needed to decrypt the bitstream. It is also possible and often useful for the Authorization Codes to provide a many-to-many mapping of wrapper keys to payload keys. Also, it is possible that some devices share keys. In the extreme case, the Authorization Code can provide a one-to-one mapping, using a shared key all the devices know to unwrap the same key, the key used to encrypt the bitstream that will be loaded into all the devices in the population.

It is not required that the wrapper key always be unique, or that the payload key is always common; however, there are some distinct advantages to this choice. Having the key stored in the device being unique for each device means that the configuration bitstream can be controlled by the IP owner(s) on a per-device basis. For example, if the IP owner wishes to authorize the production of 1000 systems, they can issue exactly 1000 Authorization Codes, each different and targeted to a specific device. Each Authorization Code transports a payload key (or keys) into the device. This payload key (or keys, or keys derived from it/them) can be common to all 1000 Authorization Codes, thus allowing each of the 1000 devices to load the same bitstream configuration data, encrypted and authenticated using the common key(s). Thus, 1000 very small Authorization Codes are used to load one very large bitstream file into the 1000 devices. This is a very efficient scheme.

Each device is first fed its assigned Authorization Code. Using the secret or private key it has persistently stored within itself, the FPGA unwraps (i.e., decrypts) the payload key. Then, when the encrypted/authenticated bitstream file is subsequently fed in, the device uses the payload key (or keys, or keys derived from them) to authenticate and decrypt the bitstream. After the bitstream data has been loaded and decrypted, the payload key(s) can then be erased from the device's memory. The Authorization Code itself is also ephemeral and should be deleted after it is used. Each Authorization Code "authorizes" or enables one specific FPGA to load a bitstream file by providing the required bitstream decryption key. It is recommended that each different bitstream be encrypted with a different key. Without an Authorization Code, specific to the target device and the encrypted bitstream in question, the bitstream cannot be copied and loaded into any other FPGAs, thus preventing cloning and overbuilding.

Permanently deleting the Authorization Code and erasing the payload key from the device's volatile memory improves the security of the bitstream encryption and authentication. If a powerful adversary captures an instance of a programmed FPGA and is able to extract the persistent key, and is also able to monitor and capture an encrypted bitstream file (perhaps as it is fed into another device or as stored on a disk drive somewhere), he still is not able to decrypt the bitstream. He would also need the Authorization Code specific to that particular FPGA, which is different from all other Authorization Codes. Without the specific Authorization Code corresponding to the unique persistent key of the particular device that was analyzed, the adversary cannot determine the payload key, which is the key needed to decrypt the bitstream. Since the Authorization Code and the associated payload key are ephemeral, short-lived data, the window of opportunity is narrowed for an attacker. This makes the typically longer-life encrypted bitstream file more secure. The bitstream key (a.k.a. the payload or the IP key) may also be retained for a longer period, but only at the IP owner's trusted facility where he can use a certified hardware security module (HSM) and other protective techniques to better prevent loss of the key. Outside of this security boundary, i.e., while in transit or in use by the device, the bitstream key is ephemeral. So, no amount of time or money spent analyzing a captured FPGA can extract the bitstream key since it is not stored (persistently) within the FPGA. This helps preserve the confidentiality of the IP and protect against reverse engineering attacks, even against very powerful adversaries.

DESCRIPTION OF THE INVENTION

Persons of ordinary skill in the art will realize that the following description of the present invention is illustrative only and not in any way limiting. Other embodiments of the invention will readily suggest themselves to such skilled persons.

Figure 1:
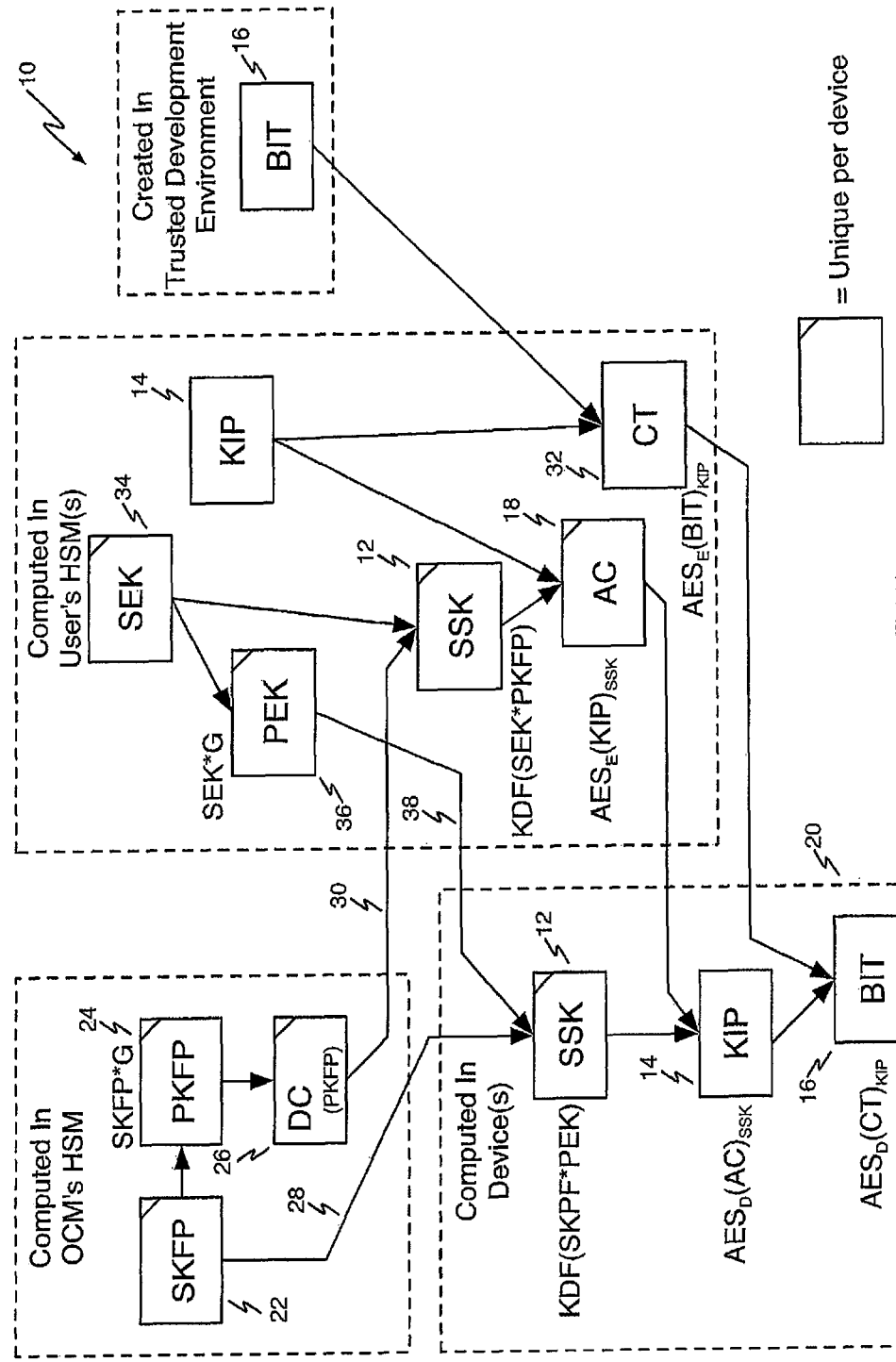
FIG. 1 is a block diagram of an illustrative asymmetric Authorization Code cryptography method according to one aspect of the present invention.

Referring first to FIG. 1, a block diagram shows an illustrative asymmetric Authorization Code cryptography method 10 according to one aspect of the present invention.

The illustrative embodiment of the invention that is shown in FIG. 1 uses public key (asymmetric) cryptographic methods to establish a shared (symmetric) secret key SSK shown at reference numeral 12, known to both the IP owner and the FPGA device. This is an ephemeral key that is unique to a single device. Thus, technically this is a hybrid symmetric/asymmetric method. However, for ease of description, this method will be referred to as an asymmetric method. In brief, the shared secret key is used to create the ephemeral Authorization Code, which transports its payload, the bitstream IP encryption key KIP, shown at reference numeral 14, securely into the device. The IP key KIP is used to decrypt the bitstream, which then is used to configure the FPGA to the IP owner's desired functionality.

In practice, many of the cryptographic computations of the IP owner typically will be automated and will be performed by specialized high-security hardware referred to as a hardware security module (HSM). The security properties of the HSM may have been evaluated by a security laboratory or agency, and certified, for example, to the U.S. National Institute of Standards and Technology (NIST) Federal Information Processing Standard (FIPS) number 140-2, level three security. It is also desirable that the Original Component Manufacturer (OCM) also use good key management practices, such as using certified HSMs for key generation, management, and use. When injecting keys into devices, ideally they are protected by strong encryption and authentication techniques while in transit in the OCM's factory.

Approximately in the time-order that the steps are performed, the method may be summarized as follows. First, the initial keys are generated and injected into blank devices, typically by the OCM. The devices are shipped to the IP owner, or very often instead to his designated contract manufacturer. Meanwhile, the IP owner has developed a configuration that he wants to load into the FPGAs. He generates a bitstream file, shown at reference numeral 16, with the long-term persistent keys he wants to use for future (e.g., field) updates ("user keys") and the other FPGA configuration data which will make the FPGA perform its intended function, using the key KIP known only to himself. Note that the devices do not know KIP, so at this point they cannot load the encrypted bitstream 16. At a point in time closer to production, the IP owner decides how many devices he wants to authorize to be produced. At the time of production, the device and the IP owner (or, more often in practice an HSM he trusts) engage in a public key protocol that results in both the device and the HSM computing the shared secret ephemeral key SSK 12. The HSM uses this key to wrap (i.e., encrypt) the IP owner's secret key KIP 14. The wrapped key is called the Authorization Code AC, shown at reference numeral 18. Authorization Codes are generated by the IP owner (or automatically by the trusted HSM) only for the authorized number of devices. The Authorization Code AC 18 is fed to the device 20, pre-pending the encrypted bitstream BIT 16 which is also fed to the device 20. The device 20 uses the shared secret key SSK 12 to unwrap (i.e., decrypt) the IP key KIP 14. Now, the device 20 has the key it needs to decrypt the encrypted bitstream and program itself with the long-term user keys and other FPGA configuration data. The IP key KIP 14 and the Authorization Code AC 18 are deleted from the device 20 once they are no longer needed, i.e., after the bitstream is decrypted.

For the reasons discussed above, it is preferred that a unique secret key be used for each FPGA. In this embodiment, this key is a private key of a private-public elliptic-curve cryptography (ECC) key pair. It is desired that the private key SKFP, at reference numeral 22 in FIG. 1, be an equally distributed randomly generated key, and in this exemplary embodiment of the invention is different for every device. Depending upon the security level desired and the ECC domain parameters chosen, this key could be something on the order of 256, 384, or 521 bits long. In FIG. 1, the private key SKFP 22 is shown originating with the OCM, but it may also be generated internally in the device if the device contains true random number bit generation capability. In that case, the device may also compute a public key PKFP, shown at reference numeral 24, and export it to the OCM's HSM for inclusion in a public-key digital certificate DC, shown at reference numeral 26, signed by the OCM, for example, a certificate conforming to the International Telecommunication Union-Telecommunications Standard ITU-T X.509 standard. The ECC private key generation and the subsequent calculation of the associated public key PKFP 24 may be performed following a standard such as NIST Special Publication (SP) 800-56A. The critical step in calculating the public key PKFP 24 from the private key SKFP 22 is to multiply the private key 22 by a base point chosen on the elliptic curve, called "G," as noted in FIG. 1. This operation results in another point on the curve, the coordinates of which the public key PKFP is comprised. It is considered a cryptographically difficult problem to reverse this operation and calculate the secret key given the resulting point (i.e., the public key PKFP). Since the private key SKFP is unique per device, so is the public key PKFP. As the names imply, the private key SKFP should be kept secret, but for the public key PKFP this is not a requirement. The precise mathematics are well known to those of ordinary skill in the cryptographic art, and are described in detail in SP800-56A. The point "G" is given as part of the domain parameters of the curve chosen by the designer, and several suitable sets of domain parameters with different key lengths are provided by NIST and other sources. The private key SKFP is stored persistently in the FPGA by the OCM as shown by an arrow 28, and the (certified) public key delivered to the IP owner as shown by an arrow 30. The certificate DC 26 is calculated from the certificate data, which can include most any information the designer desires, such as the device serial number and model number. Most importantly for this purpose is that the data includes the public key PKFP 24. The certificate DC 26 is signed by the OCM using a private key typically reserved for this purpose. The signing of the certificate is not shown in FIG. 1, but generating certificates is well known in the art, and a standard such as ITU-T X.509 may be followed. The easiest and most convenient way to deliver the public key certificate in the case of flash-based FPGAs is for the OCM to store it persistently in the FPGA as shown in FIG. 1 so it is automatically delivered to the IP owner (or his programming agent such as a contract manufacturer) along with the FPGA itself. When the programming software first communicates with the device, it can request the device to export the certificate to it whereupon the certificate digital signature can be verified and the public key used, as will be described below. In the case of SRAM FPGAs, another delivery channel may need to be used, assuming there is not enough non-volatile storage (such as anti-fuse cells) to hold both the public key certificate DC and the private key SKPF.

The IP owner prepares his desired FPGA configuration bitstream BIT 16 using the OCM's and possibly third party tools, as is well known by persons of ordinary skill in the FPGA art. Assuming that one configuration is to be loaded in a plurality of devices, the single bitstream file BIT 16 may be encrypted using the key KIP chosen by the user, preferably an equally distributed-randomly-generated key or other approved key generation method. This key KIP could be a 256 bit long AES key, for example. This key, or keys derived from it, are then used to encrypt the plaintext bitstream (BIT) using, for example, an encryption mode of AES to obtain the encrypted bitstream, shown as CT at reference numeral 32, as indicated in FIG. 1, and also creates a symmetric message authentication code (a.k.a. "tag") which is not shown explicitly but is assumed to part of the encrypted bitstream CT 32. Alternatively, an asymmetric public key method, such as a digital signature, could be used for authentication. The bitstream BIT 16 should be kept secret. The ciphertext version CT 32 does not have to be kept secret.

In this example, the enciphered and tagged or signed form of the bitstream CT 32 is common to all the FPGAs that will be programmed (configured), though the method of the present invention can also be used if some or all of the configuration data is different for different individual FPGAs or groups of FPGAs. This could be the case where the IP owner is putting some unique data, such as his own system-level serial number or cryptographic key or public key certificate, into each device. One advantage of the present invention in such a case is that it allows both the common portion of the bitstream, and any unique bitstream sections, to be encrypted in advance of knowing what specific devices they will be programmed into. For example, if 1000 FPGAs were to be configured with a bitstream that was largely common, but had 1000 different system-level serial numbers that needed to be loaded, one per FPGA, this could be treated as 1001 bitstream sections (including the large common portion and the 1000 serial numbers). These could be encrypted, in advance, with one, two, or 1001 different encryption keys, selected by any method, including selecting them at random. Then, when the actual devices are available in the production environment, 1000 Authorization Codes would be generated (as will be described in more detail herein) to transport the bitstream IP key for the common part of the bitstream into the 1000 devices, and if a different shared key was used (or if unique keys were used) for the 1000 unique (e.g., containing system-level serial-numbers) portions of the bitstream, another 1000 Authorization Codes (AC) would be generated to transport this key (or 1000 keys) into the 1000 devices.

In the system production environment the IP owner or his agent, using his HSM, communicates with the FPGA devices. This may be done either before they are assembled into the system circuit boards (using sockets), or after, depending in part on the FPGA technology used. Most modern FPGAs communicate, for configuration and system test purposes, over a Joint Test Action Group (JTAG) port, as defined by the Institute of Electrical and Electronic Engineers (IEEE) JTAG standard 1149.1, and perhaps, optionally over other interfaces such as a serial peripheral interface (SPI). The FPGA exports the public key certificate DC 26 to the IP owner's HSM. There, the HSM can check the validity of the certificate's digital signature using the OCM's public key, which would be pre-loaded and trusted by the HSM for this purpose. The digital signature binds together and authenticates the contents of the certificate. For purposes of this process, the essential operation is that the device's public key (PKFP) is certified as authentic by the OCM. Verifying the integrity and authenticity of the certificate can have other benefits, such as providing improved supply-chain assurances, but this is not the main object of this invention. Using methods well known by those skilled in the art, the device can also be challenged to prove it "knows" the corresponding private key SKFP 22, thus proving the certificate and device 20 belong together, and authenticates the device 20 to the HSM. (This step is not shown in FIG. 1.)

Instead of using a long-term public-private key pair with an OCM-certified public key, it is also possible for the device to generate an ephemeral key pair. In that case, some other method of authenticating the public key that is exported to the HSM should be used to prevent man-in-the-middle attacks, malicious software clones, or other such attacks.

The HSM either has a long-term static ECC key pair, or as shown in the example of FIG. 1, generates an ephemeral key pair for use just once with just one device. In FIG. 1, the HSM private key is shown at reference numeral 34 as SEK, and the corresponding public key that the HSM calculates from it is shown at reference numeral 36 as PEK. The calculation is similar to the way the device key pair is computed. The essential operation is multiplying the secret key SEK by a base point given in the domain parameters G to obtain a resulting point, which is used as the public key (PEK), as noted in the figure. The domain parameters, including the point G, must be the same for both the device and the HSM key pairs. Since the FPGA business model is that anyone can buy and program new devices, the device typically does not attempt any authentication of the IP owner, his HSM, or any keys during the first programming steps. (Later, IP owner keys injected during these initial programming steps should be used to authenticate any subsequent inputs.) The HSM shares its (ephemeral) public ECC key PEK 36 with the FPGA as shown by an arrow 38. Both the FPGA and the HSM then can compute the same shared secret key SSK 12 by using an elliptic curve Diffie-Hellman protocol (ECDH). In this protocol, the FPGA multiplies its secret key SKFP 22 by the HSM's public key PEK 36, and then uses a key derivation function (KDF) to reduce the result, which may be up to 1024 bits long, to the SSK key, for example, a 256 bit symmetric AES key, as indicated by the formula for the device's SSK key in FIG. 1.

The HSM does something similar, but using its own private key SEK 34, and the FPGAs public key PKFP, from the device certificate DC 26 as indicated by the formula for the HSM's SSK as shown in FIG. 1. A standardized example of how to perform shared-key establishment using the ECDH protocol is described in NIST SP800-56A. There are a number of well-known protocols, some documented in SP800-56A, to perform the authentication of the device's public key, and establishment of a shared secret, and verification that the resulting key is in fact shared. Some of these methods combine several of these objectives in a cryptographically sound protocol.

The shared key SSK 12 is then used to wrap (encrypt) the IP key KIP 14, or keys, resulting in the Authorization Code AC 18 as shown in FIG. 1. Persons of ordinary skill in the art appreciate that there are well-known protocols for wrapping keys, including at least one published by NIST. This could be done using an encryption mode of AES, as indicated in the formula for computing AC 18 shown in FIG. 1. The device receives the Authorization Code AC 18 and, using the shared secret key SSK 12 it independently computed, the FPGA unwraps (decrypts) the payload key, namely, the IP key KIP 14. Following the example shown in FIG. 1, this would be done with a decryption mode of AES, as indicated in the formula in FIG. 1. This key should only be kept in volatile memory and deleted after it is used in order to improve security, as described above. KIP 14, or key(s) derived from it, are used to authenticate and decrypt the encrypted bitstream CT 32, for example, using a decryption mode of the Advanced Encryption Standard (AES) as indicated in FIG. 1 (the particular authentication is not explicitly shown in FIG. 1), so the decrypted plaintext version BIT 16 may be used to configure the functionality of the FPGA.

In an alternative embodiment, only symmetric cryptographic methods are used in the FPGA. This removes the requirement for the FPGA device to perform public key cryptography, which is typically thousands of times more computationally intensive than symmetric cryptography, and may be a costly burden especially for smaller, more constrained, devices.

Figure 2:
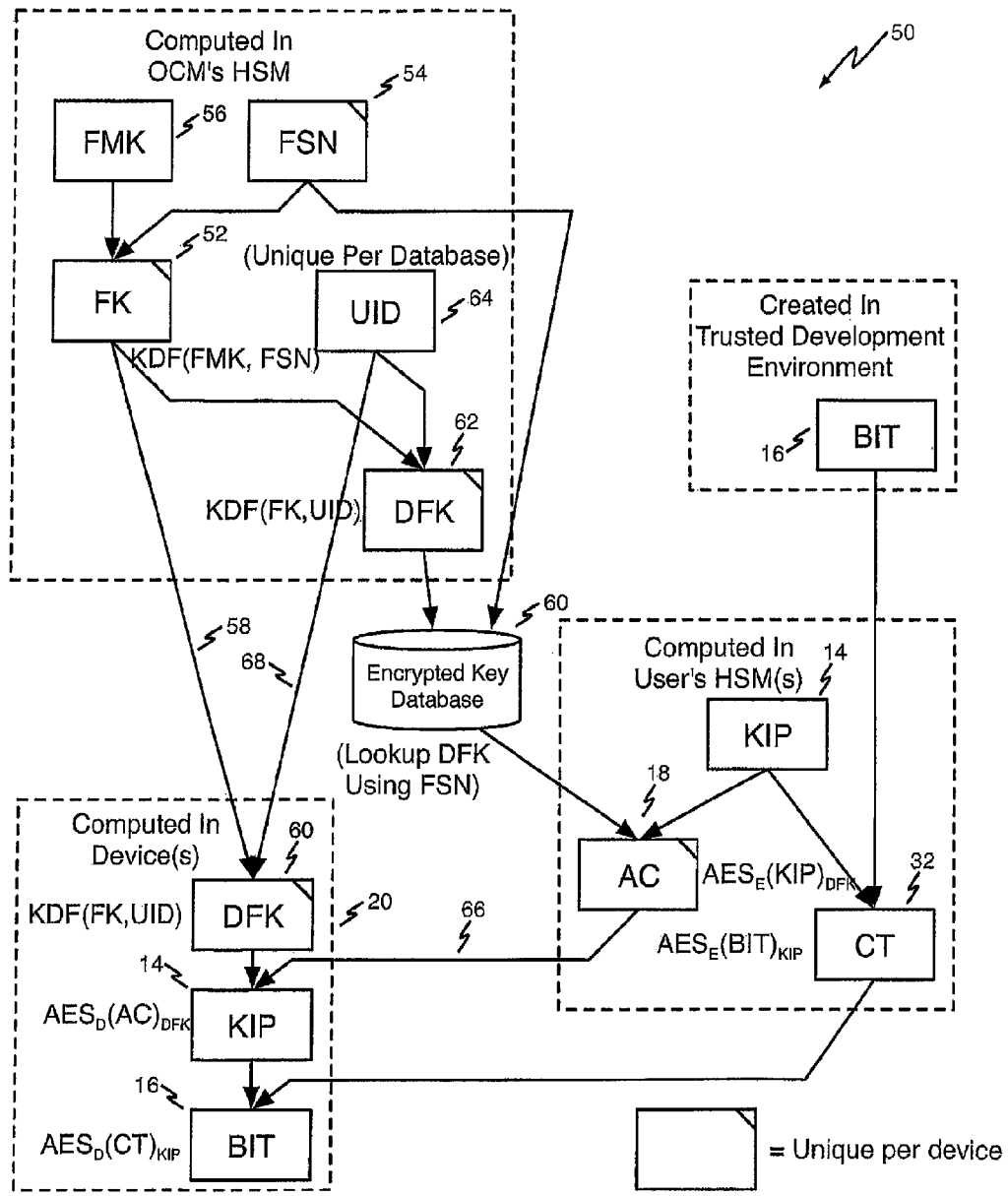
FIG. 2 is a block diagram of an illustrative symmetric Authorization Code cryptography method according to another aspect of the present invention.

Referring now to FIG. 2, a block diagram shows an illustrative symmetric Authorization Code cryptography method 50 according to another aspect of the present invention. For ease of understanding, elements of the invention that appear in both FIG. 1 and FIG. 2 will be designated by the same reference numerals used in FIG. 1.

In the illustrative embodiment of the invention shown in FIG. 2, the use and benefits of the Authorization Code AC 18 are essentially the same as in the illustrative embodiment described with reference to FIG. 1, above. The differences are mainly in how the wrapper key for the Authorization Code AC 18 is computed. In symmetric key cryptography, the same key is used for encryption and decryption (or for generating and verifying message authentication codes). This key must be shared by both parties in the transaction, in this case the FPGA and the IP owner's HSM. The OCM facilitates this as a trusted party in generating and distributing keys.

A unique secret symmetric "factory" key is generated by the OCM and securely injected into each of the new. FPGAs before they are shipped to customers. In the example, the factory key, FK at reference numeral 52 in FIG. 2, is derived from the unique device serial number, FSN at reference numeral 54 in FIG. 2 and a factory master key FMK 56 using a key derivation function KDF as indicated in the formula for FK 52 in FIG. 2, but a random key could be used for each device instead. Using random keys may entail the OCM having to store more information. The factory key FK is injected into device 20 as shown by an arrow 58.

Besides injecting the unique factory key directly into persistent memory in each device 20, the factory key is also used by the OCM to populate key databases 60, consisting of one key for every device the IP owner(s) will be using, indexed by the device's factory serial number FSN 54. Each key in the key database 60 is diversified from that device's factory key FK 52 by a nonce associated with each individual database. The key(s) in the database 60 are called diversified factory keys (DFK at reference numeral 62 in FIG. 2), and the nonce used to perform the diversification is called the user ID (UID at reference numeral 64 in FIG. 2). It is important that the same UID 64 never be used to generate two key databases 60—just as it is important that the serial number and factory key FK 52 are unique for every device 20. The diversified key is derived using a strongly one-way key derivation function KDF, as indicated in the formula for calculating DFK 62 shown in FIG. 2. Therefore, knowledge of derived keys in one key database leaks no information about the factory keys (in the FPGAs), or keys in any other key databases created using a different UID 64, even those derived from some or all of the same factory keys. The diversified keys DFK 62 need to be kept secret. As a practical matter, key databases are likely encrypted between when they are generated and when they are used. Each key database is delivered to only one IP owner, who keeps it confidential. In practice, this means only his HSM decrypts the key database. The user ID UID 64 does not need to be kept secret.

During FPGA production configuration by the IP owner, the serial number FSN 54 is read from the device, and the IP owner's HSM looks up the corresponding diversified factory key DFK 62 in the key database 60 he received from the OCM (and decrypts it, if necessary). Recall, this derived key is related to the unique factory key FK 52 in that device by the user ID UID 64 via the one-way key derivation function. The HSM generates the Authorization Code AC 18 in FIG. 2 for that device 20 (and bitstream) by wrapping the bitstream IP key KIP 14 with the diversified factory key DFK 62 for that particular device from the database 60. Wrapping could be performed, for example, using an encryption mode of AES, as indicated by the formula for AC 18 shown in FIG. 2. The bitstream key KIP 14 could be common amongst many devices in a project, or could be a unique key—particularly if unique data is being programmed into different devices 20 by that section of the bitstream BIT 16. The Authorization Code AC 18 is transmitted to the device 20 (as shown by arrow 66), along with the user ID UID 64 (as shown at arrow 68).

The FPGA device 20 calculates the same diversified factory key DFK 62 as the OCM did when it populated the key database 60, using the UID 64 and its own persistent factory key FK 52. This is done using the exact same formula as the OCM used, as indicated by the use of the same key derivation function with the same input parameters (FK and UID) as were used to create the DFK 62 stored and transmitted using the key database 60. Thus, the HSM and the FPGA now share the identical wrapper keys, DFK 62. Note that this works regardless which key database the IP owner received. The DFK 62 in the database 60 and calculated by the device 20 will be different for different values of UID 64, but the result is still a shared secret key. This allows the FPGA device 20 to unwrap the payload key KIP 14, or keys, from the Authorization Code AC 18 and then use it (KIP 14) to authenticate and decrypt the bitstream, which is then used to configure the FPGA functionality.

Encryption of the bitstream BIT 16 using the IP key KIP 14 to create the encrypted ciphertext version of it (CT 32) using an encryption mode of AES is identical to the method in the first embodiment, shown in FIG. 1. Likewise, decryption of the ciphertext bitstream by the device using a decryption mode of AES to recover the plaintext bitstream is also identical between these two embodiments. As with the illustrative embodiment shown in FIG. 1, authentication could be performed either by using symmetric or asymmetric methods.

Figure 3:
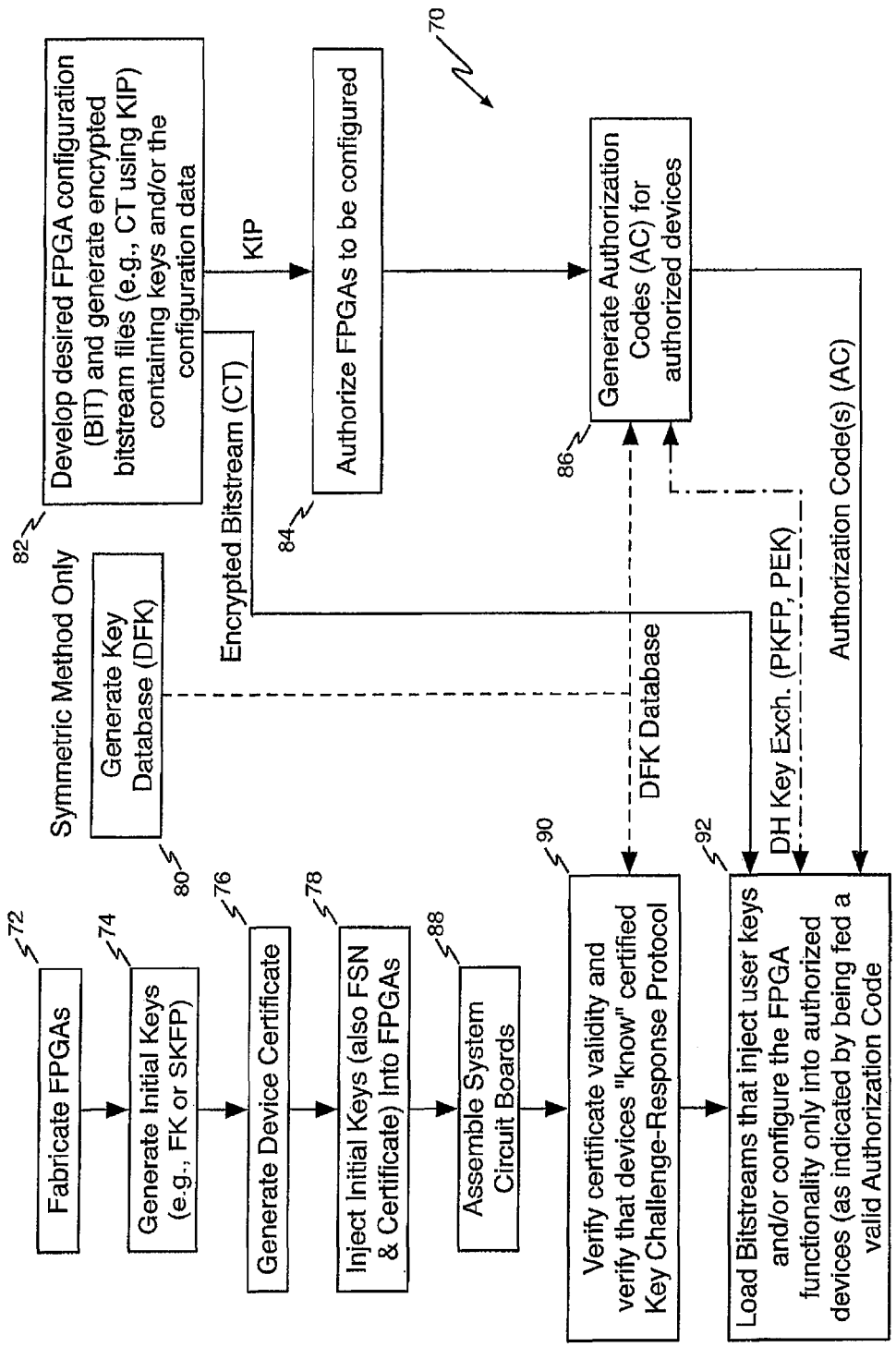
FIG. 3 is a flow diagram of an illustrative Authorization Code method according to the present invention showing both asymmetric and symmetric cryptographic approaches.

Referring now to FIG. 3, a block diagram of an illustrative Authorization Code method 70 of the present invention shows both the asymmetric and symmetric cryptographic approaches in a broader context.

The illustrative embodiment of the invention that is shown in FIG. 3 uses either public key (hybrid asymmetric) cryptographic methods or strictly symmetric cryptographic methods to generate the Authorization Code. As such, there are frequent references to FIG. 1 and FIG. 2 in the following description of FIG. 3. Additional context is shown in FIG. 3 by elaborating the steps that are typically performed by the original component manufacturer (OCM), those performed by the IP owner(s) in preparation for the manufacture of the systems containing FPGAs, and those performed by the IP owner or his designated contract manufacturer (CM) during the manufacture and provisioning of systems containing FPGAs.

At reference numeral 72, the OCM fabricates the FPGA devices and then at reference numeral 74 generates the secret or private keys as described in the illustrative examples shown in FIG. 1 and FIG. 2. If the asymmetric method is being followed, then the private key SKFP is generated, along with the public half of the key pair PKFP. If the symmetric method is being used, then FK is generated.

At reference numeral 76, the device certificate (DC in FIG. 1) is generated. In the case of the asymmetric method, this certificate would include the public key (PKFP). In the case of the symmetric method there might not be a public key; however, there still might be a certificate that contains a code that can be used by the IP owner who has access to any DFK key database in a way to challenge the device to prove it "knows" FK, thus cryptographically binding the certificate to the device, similar to the way the device can be challenged to prove it "knows" SKFP in the asymmetric case. Note that use of a device certificate is not shown in FIG. 2 because it does not contain any information essential to generating a wrapper key when symmetric methods are used. However, as already mentioned, there are other benefits to using the device certificate.

At reference numeral 78, the private or secret key(s), the device serial number, and the device certificate are securely loaded and stored in the FPGA. The key-injection step may be done at any time after the devices are fabricated, such as at when the silicon wafers are being tested, or after they are diced and packaged, or both. While the secret key(s) should be stored in the FPGA, it is possible to deliver the certificate to the IP owner by some other channel, especially since it is public data and does not need to be kept secret.

If the symmetric method is being used, key databases must also be prepared by the OCM as shown at reference numeral 80, as shown in more detail in FIG. 2. The databases contain diversified keys derived from the secret key, FK, stored in the devices. The key databases may be generated either before or after the devices are fabricated and provisioned with keys. In fact, it is advantageous to generate databases of keys that will be used well into the future, so they can be distributed to the IP owners even before the FPGAs are manufactured by the OCM and shipped to the IP owner. If the device secret key (FK) is derived from the device serial number, as shown in the illustrative example of FIG. 2, then databases of derived keys (DFK) indexed by a serial number can be generated in advance of actual devices if future serial numbers are predictable, or at least most are so. If secret keys are generated totally at random (not shown in any figure), then they can be generated in advance of the devices being fabricated and stored securely by the OCM, for example, using HSMs. The diversified key databases can then be produced as soon as the device secret random keys are generated, and the secret key injected into the device only after the device has been fabricated, which could be many months later. During the intervening time, the random keys would need to remain stored.

Separate from the timeline of the OCM producing components and producing key databases, the IP owner will be developing his desired FPGA configuration, as shown at reference numeral 82. Once the design has stabilized and the IP owner wishes to program it into actual physical FPGAs, he generates a secret IP key (KIP) and uses it to encrypt the bitstream (BIT), creating the ciphertext version of it (CT). His key (KIP) is not known by the OCM or by any of the devices. The encrypted bitstream BIT is delivered to the manufacturing process. This might be factory owned or managed by the IP owner, or it might run by his hired agent, such as a contract manufacturer (CM) he designated. Unlike in the prior art, the encrypted bitstream can also contain (encrypted) keys that are used to configure the persistent key storage cells in the FPGA. In the prior art, these long-term keys were loaded in plaintext form, creating logistical problems if the CM was not fully trusted with the key, and hence, indirectly the bitstream information. In SRAM FPGAs, these persistent keys can be used to load the encrypted bitstream on each power-up cycle. In flash FPGAs, they can be used for configuration updates, even in fielded devices. When these keys are loaded, the original keys injected by the OCM are disabled for configuration or key update purposes. In essence, this is when the FPGA is turned from a "publicly owned" device where anyone who possesses it can program it, into a "privately owned" device where only someone who knows a user key can overwrite it.

Near the time when each lot of systems is to be manufactured, and as shown at reference numeral 84, the IP owner decides how many devices ("n") will be authorized in that production run. This intent can be encoded in the form of a job ticket that authorizes a certain number of devices. This job ticket usually allows devices to be programmed on a first-come basis without regard to their serial number or keys, but it is also possible to implement a more tightly controlled system where the authorization is only granted after the serial numbers are known, and then the authorization can be tied not just to a general population of "n" devices, but to "n" specific "named" devices.

At reference numeral 86, the IP owner generates Authorization Codes for all the authorized FPGAs. The Authorization Codes (AC 18 in both FIGS. 1 and 2), which are unique to each device 20 (assuming the secret key the device has persistently stored that is used as the wrapper key is unique), are used to transport the key or keys KIP (reference numeral 14 in FIGS. 1 and 2) used to encrypt (and authenticate) the bitstream BIT 16 in each device 20.

If the symmetric Authorization Code method of FIG. 2 is being used with new devices direct from the OCM, the wrapper key would be the diversified key DFK 62 for that serial number device FSN 54 and that user ID UID 64, which in the illustrative embodiment described with reference to FIG. 2 would be unique per device. The IP owner (or trusted HSM) would get the DFK 62 for that device from the key database 60. The device would get the DFK 62 for that UID 64 by computing it internally from FK 52 and UID 64.

If the asymmetric Authorization Code method of FIG. 1 is being used with new devices, the shared secret key SSK 12 would be the wrapper key. In the illustrative embodiment, this would also be unique per device since the private-public key pair generated by the HSM (SEK 34, PEK 36) are ephemeral and are generated uniquely each time the protocol is run. SSK 12 is computed by the HSM from its private key (SEK 34) and the device's public key (PKFP 24). In the device 20, SSK 12 is computed from the device's secret key (SKFP 22) and the HSM's public key (PEK 36). This is accomplished by the HSM and FPGA exchanging their public keys right at the time of programming, so the Authorization Code AC 18 for that session can be computed by the HSM and used to transport KIP 14 into the FPGA where it is unwrapped and used by the FPGA.

Before programming, the FPGA devices are assembled into final circuit boards as shown at reference numeral 88. During the actual production programming, the IP owner, or more likely in actual practice, an HSM trusted by the IP owner, communicates with the devices, obtaining each device's serial number and device certificate. The OCM's digital signature on the certificate can be verified, thus authenticating the certificates and the integrity of all the data in the certificate. This is done using the OCM's public key. As shown at reference numeral 90, a challenge-and-response type protocol can be used to verify the device "knows" a secret key that binds it and the certificate together, to prove that a verifiable certificate was not just copied to a counterfeit device (since if it were, the counterfeit device would not be able to respond correctly to the key challenge, and would thus be detected). In the case of the symmetric method, the device would prove it "knows" FK (reference numeral 52 in FIG. 2); in the case of the asymmetric method the device would prove it "knows" SKFP (reference numeral 22 in FIG. 1). In the former case, the HSM has a symmetric code from the device certificate and the symmetric DFK key 62 from a key database 60 to use in validating that the device "knows" FK 52. In the later case, the HSM has the public key PKFP (reference numeral 24 in FIG. 1) from the device certificate to use in validating the device "knows" SKFP (reference numeral 22 in FIG. 1). At reference numeral 92, the bitstream is decrypted and used to configure the authorized FPGA device 20.

In the case of already programmed devices that have already had persistent user keys loaded into them by the IP owner (for example), he may have loaded the same (shared) key into all the FPGAs in a certain population, such as all those used for one design in one project (a "user key"). FPGAs may have key storage for more than one persistent user key. The IP owner may have loaded a unique-per-device key into each FPGA. In this case of a shared key, a bitstream used for performing a field upgrade of the (flash) FPGA could use the key stored in the all the FPGAs (the user project-wide key) when it is encrypted, or it could use the Authorization Code method and use a different key to encrypt the bitstream (KIP 14), which is then only known by the devices after they are fed an Authorization Code having KIP 14 as the payload key, and using the user key as the wrapper key. In a case like this, the same Authorization Code would be used with all the devices in that population. Overbuilding is less of a concern in this case since only a finite number of devices were originally programmed with project-wide user keys. Yet, the Authorization Code method still has some security advantages over using the user key directly as the bitstream encryption key. For example, KIP 14 is ephemeral and not stored in any devices whereas the user key is stored in all the FPGAs.

Using a different key in every device has a number of security advantages. If the key is somehow extracted from the device by a powerful adversary, it does not necessarily create an easily scalable low-cost attack on other devices having different keys, especially those used in different projects or by different end customers, as using a commonly shared key might. Each device may have to be attacked individually to have its unique key extracted. Using a different key in every device also allows each IP owner to control overbuilding of FPGAs or systems containing their IP, since each device requires a unique Authorization Code for each bitstream. If different portions of the device configuration originate with different IP owners, each IP owner can encrypt their own section with a key only they know, and enable an HSM to generate Authorization Codes only for a certain number of devices, or restricted even to particular serial-number "named" devices. Data can be targeted to load in only one device. For example, some optional system-level features can be activated by loading data that enables it, and the bitstream that does this could be authorized (using individual Authorization Codes) only for those end customers that have paid for the feature.

Because the key needed to decrypt the bitstream (KIP 14) is ephemeral (except perhaps inside the IP owner's trusted environment and HSMs)—and, in particular, is not stored for a long term inside any FPGA devices—it improves the security of the bitstream data including helping to preserve its confidentiality which in turn reduces the risk of clones, reverse engineering, and tampering with the bitstreams (such as adding a Trojan Horse).

The Authorization Code separates the key the device "knows" from the key used to encrypt the bitstream. In prior art FPGAs, these two uses were always done with one and the same key. This allows the device to use unique keys per device, with the advantages listed above. It also allows for public key methods to be used, with random ephemeral keys established even after the devices leave the OCM. These keys, established using public key methods, are also unique per device. The preferred embodiment, using public key methods, has the advantage that there are no pre-shared keys or key databases to have to distribute securely. When public key methods are used, the OCM's role as a trusted generator and distributor of keys is reduced to the function of just certifying the device public key. Unlike with the symmetric key method, it is not possible for the OCM to know the Authorization Code wrapper key, since it is generated, in part, from fresh random secret keys that are not even present when the OCM last possesses the devices. Thus, any concerns about rogue insiders at the OCM's factory being able to record secret keys are reduced. The Authorization Code allows the user to use different keys for each device without the IP owner having to encrypt his large bitstream files differently for every device. Only the very short Authorization Code needs to be generated on a per-device basis. This is a small cost that is well compensated by the advantages it brings.

In all prior art FPGAs, the bitstream key was loaded by the IP owner. Since all prior art FPGAs also only use symmetric cryptography for bitstream encryption, this means that the IP owner's key(s) were always loaded in plaintext or perhaps, at best, some shared obfuscated key or obscure key derivation method was used. With this invention, the OCM can load a persistent symmetric key (as taught in the second embodiment), or a public-private key pair (as taught in the first embodiment), and this key can be used to encrypt and/or authenticate the IP owner's bitstream, and to prove the provenance of the device itself, using strong cryptographic methods (not just obfuscation). In particular, the main purpose of the IP owner's first bitstream may be to load secret keys known only to him (or more precisely, his HSM) into the FPGA's persistent memory that can then be used for loading all subsequent bitstreams. In this case, the OCM-injected keys should be disabled in favor of the IP owner keys so the FPGA configuration cannot be overwritten as if it were a new device direct from the OCM. It is important to repeat that without the method of the invention, it was impractical in prior art FPGAs for the IP owner to load his own project-wide or unique-per-device bitstream keys using strong cryptography, since there was no practical way to take advantage of keys that were different in each device as delivered from the OCM or as the result of a public key protocol.

Finally, the method is practical for the OCM who can use the same manufacturing process for injecting keys in each FPGA without regard to which IP owner will eventually receive and use that device. Each device receives a unique key or keys, and it does not matter which IP owners receive which devices as they are all interchangeable. The method of the invention allows any device to be used by any IP owner (or group of IP owners).

The present invention allows the use of the same bitstream configuration file with multiple FPGAs having different keys loaded in them. The present invention also allows the configuration of the FPGA, at one time or at multiple times, with IP from different IP owners, without having to proliferate the number of keys loaded in the FPGA or experiencing a loss of confidentiality of any portion of the IP. The present invention allows positive control over the number of FPGAs that are configured with a bitstream, to prevent cloning or overbuilding attacks, improves the security of the bitstream with respect to preserving the confidentiality of the IP it embodies, and also protects against reverse engineering attacks. Another advantage of the invention is that it allows advance preparation of encrypted bitstream files (or portions thereof) in advance of knowing what specific devices they will be used with. The present invention provides the ability to load bitstreams without the need of any pre-shared keys and avoids the need for any customization, such as the loading of specific keys, for devices dependent upon the user they are shipped to, i.e., all devices are manufactured using the same method (including key generation and injection), regardless of to which FPGA customer it is ultimately shipped.

Both the symmetric and asymmetric embodiments of the present invention provide the advantages of the invention. They both use a (preferably) unique-per-device secret or private device key. This key may be generated by the OCM (in an HSM) or by the device, and may be stored in persistent memory. (It must be stored in persistent memory in the symmetric cryptography embodiment.)

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

The invention claimed is:

1. A method for securely programming a population of authorized FPGAs comprising:
    defining the population of authorized FPGAs, each FPGA containing a unique device serial number and a unique factory key created at the time of manufacture of the FPGA;
    generating a single encrypted configuration bitstream for the population of authorized FPGAs using a single bitstream encryption key that is not known by any of the FPGAs;
    generating an individual authorization code for each FPGA in the population of authorized FPGAs, each authorization code generated outside the FPGA using both the unique factory key associated with the unique device serial number of one of the FPGA devices and the single bitstream encryption key;
    feeding each individual authorization code into the FPGA in the population of FPGAs having the serial number associated with the unique factory key used to generate the authorization code;
    feeding the encrypted configuration bitstream into all of the FPGAs in the population of FPGAs;
    in each FPGA using the authorization code and the unique factory key to extract the bitstream key to decrypt the encrypted configuration bitstream; and
    using the decrypted configuration bitstream to program the FPGA.

2. The method of claim 1 further comprising deleting the authorization code and the keying material in each FPGA in the population of FPGAs after it has been used to decrypt the bitstream.

3. The method of claim 1 wherein different encryption keys and authorization codes are used for different sections of the configuration bitstream.

4. The method of claim 3 wherein the configuration bitstreams fed into a single FPGA comprise multiple encrypted bitstream sections, each section being associated with its own authorization code.

5. The method of claim 4 wherein one section of the configuration bitstreams is common to a population of FPGAs, and another section is not.

6. The method of claim 1 wherein the individual authorization code for each FPGA in the population of authorized FPGAs transports a key used for authenticating the bitstream.

* * * * *